United States Patent
Driscoll et al.

(10) Patent No.: US 11,507,437 B2
(45) Date of Patent: Nov. 22, 2022

(54) DEPLOYING MULTIPLE DIFFERENT APPLICATIONS INTO A SINGLE SHORT-LIVED CONTAINER ALONG WITH A MASTER RUNTIME

(71) Applicant: TRACELINK, INC., North Reading, MA (US)

(72) Inventors: Christopher Driscoll, Methuen, MA (US); Robert Sturim, Wenham, MA (US); Andy Nanopoulos, Wakefield, MA (US); Satish Chitnis, Lexington, MA (US); Kurt Umholtz, West Newbury, MA (US); Shabbir Dahod, Andover, MA (US)

(73) Assignee: Tracelink Inc., Wilmington, MA (US)

( * ) Notice: Subject to any disclaimer, the term of this patent is extended or adjusted under 35 U.S.C. 154(b) by 0 days.

(21) Appl. No.: 16/937,011

(22) Filed: Jul. 23, 2020

(65) Prior Publication Data
US 2022/0027216 A1    Jan. 27, 2022

(51) Int. Cl.
*G06F 9/54* (2006.01)
*G06F 9/455* (2018.01)
*G06F 8/60* (2018.01)

(52) U.S. Cl.
CPC .............. *G06F 9/542* (2013.01); *G06F 8/60* (2013.01); *G06F 9/455* (2013.01)

(58) Field of Classification Search
CPC ............. G06F 9/542; G06F 8/60; G06F 9/455
See application file for complete search history.

(56) References Cited

U.S. PATENT DOCUMENTS

| | | | | |
|---|---|---|---|---|
| 11,113,177 | B1* | 9/2021 | Chitnis | H04L 67/564 |
| 2015/0128152 | A1* | 5/2015 | Lachaume | G06F 9/4488 |
| | | | | 719/316 |
| 2016/0335454 | A1* | 11/2016 | Choe | G06F 21/629 |
| 2018/0176106 | A1* | 6/2018 | Raney | H04L 43/20 |
| 2018/0336351 | A1* | 11/2018 | Jeffries | H04L 63/101 |
| 2018/0367422 | A1* | 12/2018 | Raney | H04L 43/062 |

(Continued)

OTHER PUBLICATIONS

Roberto Morabito, Riccardo Petrolo, Valeria Loscri, Nathalie Mitton, Giuseppe Ruggeri, Antonella Molinaro; Lightweight Virtualization as Enabling Technology for Future Smart Cars; 9 pages; May 18, 2017 (Year: 2017).*

*Primary Examiner* — S. Sough
*Assistant Examiner* — Kimberly L Jordan
(74) *Attorney, Agent, or Firm* — CRGO Global; Steven M. Greenberg

(57) ABSTRACT

Multi-application instance deployment in a containerized environment includes containerizing an instance of an application manager in a short-lived container and deploying into the container, both a bundle of different event handlers associated with one application instance of one application, and also a bundle of additional event handlers associated with a different application instance of a different application. Thereafter, the application manager manages inter-application communications between the one application instance and the different application instance, and routes events for both the one application instance and the different application instance in an event router included as part of the application manager. Hence, the application manager may be viewed as providing a virtualization layer on top of the short-lived container.

15 Claims, 2 Drawing Sheets

(56) References Cited

U.S. PATENT DOCUMENTS

2019/0235906 A1* 8/2019 Asawa .................. G06F 9/4875
2022/0141761 A1* 5/2022 Cai ........................ H04L 67/63
709/222

* cited by examiner

DEPLOYING MULTIPLE DIFFERENT APPLICATIONS INTO A SINGLE SHORT-LIVED CONTAINER ALONG WITH A MASTER RUNTIME

BACKGROUND OF THE INVENTION

Field of the Invention

The present invention relates to the field of virtualization and more particularly to the deployment of an application into a short-lived containerized computing environment.

Description of the Related Art

Conventionally, computer programs execute within an operating system environment on the bare metal of a computer with the operating system processing the program instructions of the computer program and providing moderated access to the resources of the computer. In the modern era of computing, however, the execution of multiple different programs within the same computer has become an essential requirement. To that end, virtualization is a technology that permits the execution of different computer program instances in different isolated virtual machines, known as "guests" and managed by a supervising process, known as a "hypervisor". Each virtual machine is isolated from each other virtual machine such that each instance of a computer program executing within a corresponding virtual machine remains completely isolated from other instances of the same program or other programs.

The use of virtualization, however, is not without consequence. Each virtual machine, as a guest operating system, must in of itself, support the operation of an operating system able to host the execution of a corresponding computer program instance. As will be understood, multiple different operating systems executing within corresponding virtual machines in a single computing system can consume substantial resources of the computing system thus affecting the performance of all host applications in their respective virtual machines.

To address the excess resource consumption of virtualization, containerization oftentimes is employed as a suitable substitute—especially where multiple instances of a single computer program are to be deployed within the same host computing system. Unlike virtualization, in containerization, no separate operating system is deployed in each container. Thus, containerization demands less resource consumption and thus higher operational performance for all instances of a computer program executing in a containerized host computing system.

Customarily, the traditional deployment of a containerized computing environment includes the placement different applications in separate short-lived, ephemeral containers, so as to provide "containerized" or "dockerized" microservices. Each short-lived, ephemeral container, then, enjoys its own access to computing resources of the underlying computing platform. But, not all applications are active at any given time. Consequently, in each short-lived, ephemeral container in which a dormant application resides, the processing resources allocated to that container remain idle, albeit unable to be accessed by other containers experiencing an active, consumptive application. As well, to the extent that each application is expected to reside within a separate container, each application must provide its own underlying facilities including authentication, inter-application communications, deployment and un-deployment. Hence, for multiple applications deployed into a containerized environment, duplicate logic exists for each application.

BRIEF SUMMARY OF THE INVENTION

Embodiments of the present invention address deficiencies of the art in respect to containerized computing and provide a novel and non-obvious method, system and computer program product for multi-application instance deployment in a containerized environment. In an embodiment of the invention, a method for multi-application instance deployment in a containerized environment includes containerizing an instance of an application manager in a short-lived container and deploying into the container, both a bundle of different event handlers associated with one application instance of one application, and also a bundle of additional event handlers associated with a different application instance of a different application. Thereafter, the application manager manages inter-application communications between the one application instance and the different application instance, and routes events for both the one application instance and the different application instance in an event router included as part of the application manager. Hence, the application manager may be viewed as providing a virtualization layer on top of the short-lived container.

In one aspect of the embodiment, a kernel module may be containerized within the short-lived container so as to provide deployment and un-deployment services to each of the one application instance and the different application instance, in reference to a configuration map provided by the short-lived container. The kernel module additionally may collect health and status information from each of the one application instance and the different application instance. In another aspect of the embodiment, the application manager further provides authorization management with the short-lived container for each of the one application instance and the different application instance. Finally, in even yet another aspect of the embodiment, the one application instance and the different application instance may be instances of different versions of the same application.

In another embodiment of the invention, a data processing system that provides a containerized environment and thus is adapted for multi-application instance deployment includes a host computing platform having one or more computers, each with memory and at least one processor. The system also includes a multi-instance application deployment module. The module includes computer program instructions enabled while executing in the host computing platform to containerizing an instance of an application manager in a short-lived container, deploy into the container, both a bundle of different event handlers associated with one application instance of one application, and also a bundle of additional event handlers associated with a different application instance of a different application to manage inter-application communications between the one application instance and the different application instance in the application manager, and route events for both the one application instance and the different application instance in an event router included as part of the application manager.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for multi-application instance deployment in a containerized environment. In accordance with an embodiment of the invention, an application manager is containerized into a short-lived, ephemeral container defined amongst other short-lived, ephemeral containers within a containerized computing environment. Different modules of bundled event handlers are then instantiated within the short-lived, ephemeral container, each of the modules corresponding to a different application instance of an application and each event handler including program logic adapted to process the receipt of a corresponding specific event on an event bus. In this regard, the different application instances of the application may reflect different versions of the same application by changing the implementation of different event handlers programmed to process the same event.

The application manager then provides the event bus for all of the modules, including an event router adapted to route events on the event bus to corresponding ones of the event handlers intended to receive the events. As well, the application manager provides core container management services to each of the modules, including authentication within the containerized computing environment, health and status monitoring and intra-module communications. In this way, the application manager provides a layer of virtualization on top of the containerized computing environment and permits the optimal utilization of the resources of the short-lived container by reducing the likelihood of a dormant resident application within the short-lived container.

Figure 1:
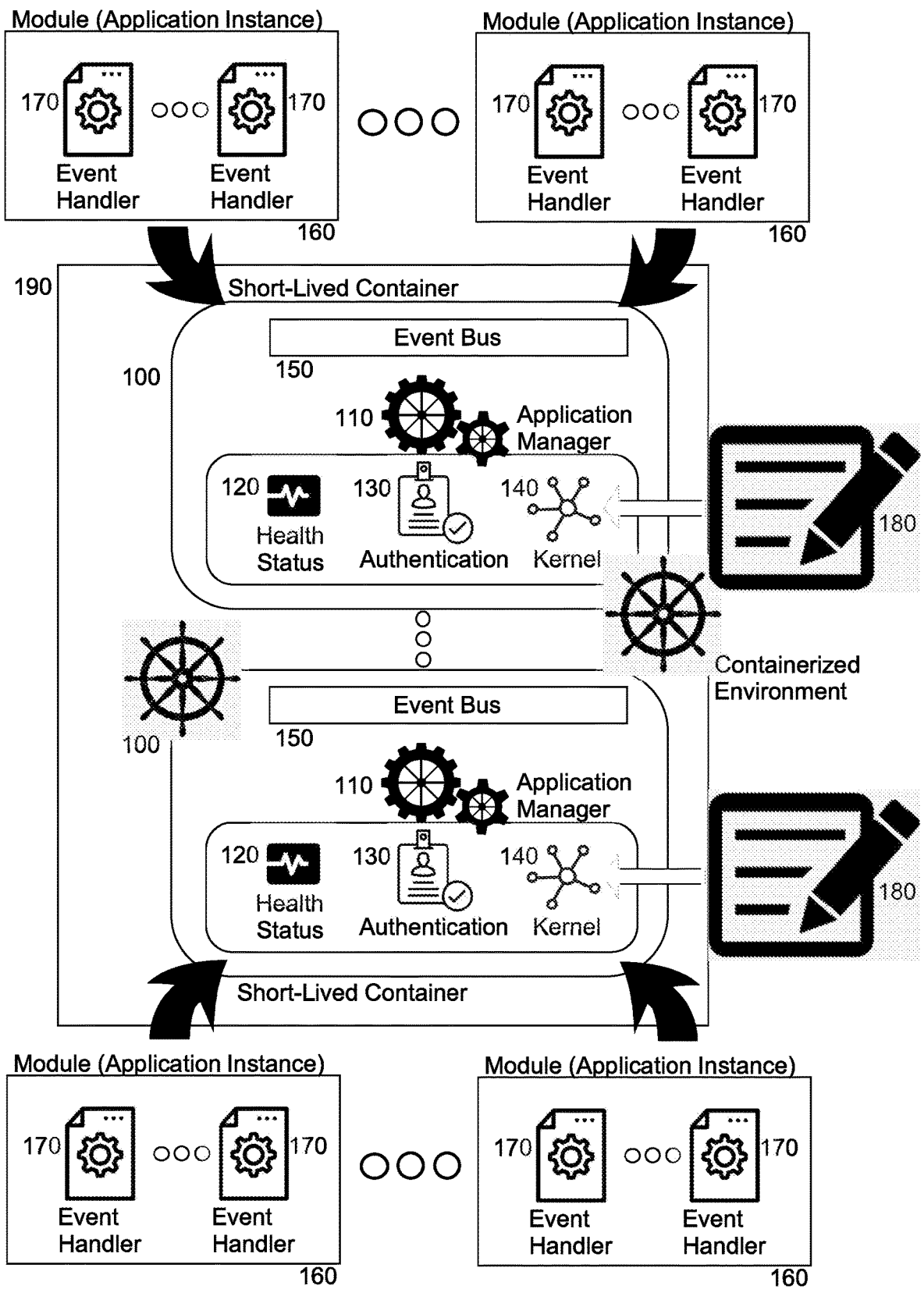
FIG. 1 is pictorial illustration of a process for multi-application instance deployment in a containerized environment.

In further illustration, FIG. 1 pictorially shows a process for multi-application instance deployment in a containerized environment. As shown in FIG. 1, different short-lived containers 100 operate within a containerized environment 190 managed by a container management system. Each container 100 includes an executing instance of an application manager 110 providing computing services 120, 130, 140, 150 to different modules 160 of different event handlers 170 for corresponding application instances. In this regard, the computing services 120, 130, 140, 150 include health status services 120 providing underlying programmatic operations for reporting operational health for the event handlers 170 of a module 160 containerized within the container 100. The computing services 120, 130, 140, 150 also include authorization services 130 providing underlying programmatic operations for authorization access to corresponding ones of the event handlers 170 of a module 160.

Even further, the computing services 120, 130, 140, 150 include kernel services 140 operable to deploy selected ones of the event handlers 170 of a module 160 based upon a manifest 180 accessible by the kernel services 140 and indicating a listing of modules 160 to be containerized within the container 100. Finally, the computing services 120, 130, 140, 150 include an event bus 150 supporting communications with each of the event handlers 160 containerized within the container 100 both originating outside of the container 100 and targeting a specific one of the event handlers 170 of a module 160 containerized within the container 100, and also originating within the container 100 by one of the event handlers 170 of a module 160 containerized within the container 100 and targeting a specific one of the event handlers 170 of a module 160 containerized within the container 100.

Figure 2:
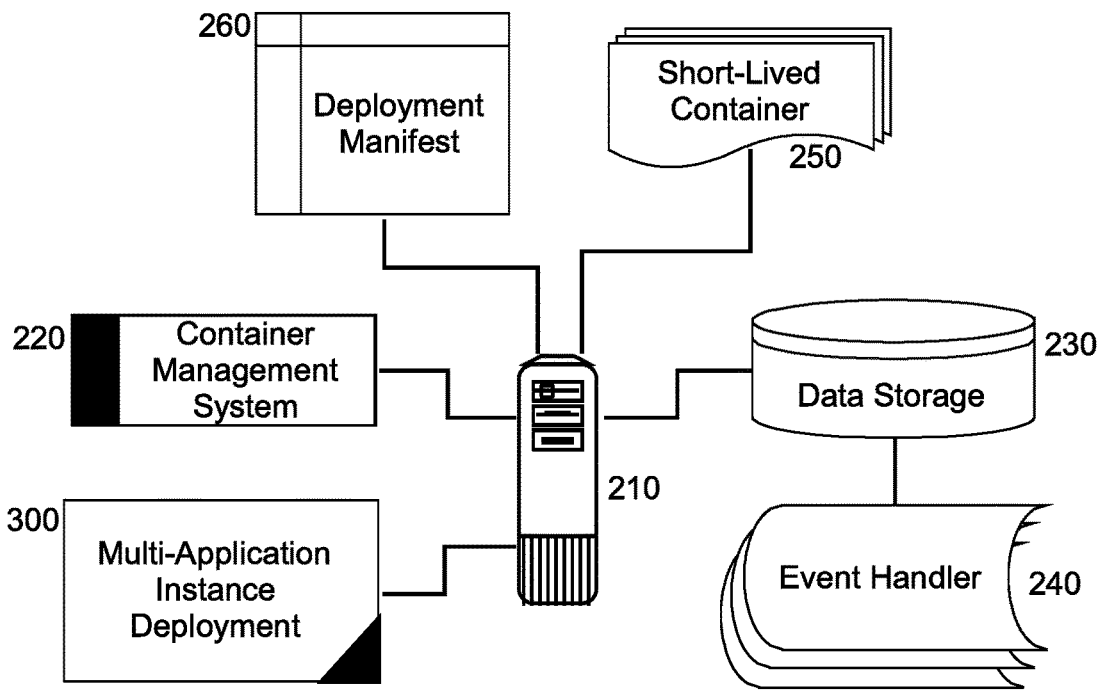
FIG. 2 is a schematic illustration of a data processing system providing a containerized computing environment and adapted for multi-application instance deployment; and, FIG. 3 is a flow chart illustrating a process for multi-application instance deployment in a containerized environment.

In further illustration, FIG. 2 schematically shows a data processing system providing a containerized computing environment and adapted for multi-application instance deployment. The system includes a host computing platform 210 that includes one or more computers, each with memory and at least one processor. A container management system 220 executes within the memory of the host computing platform 210 and is adapted to support the co-execution of multiple different short-lived containers 250 also within the memory of the host computing platform 210. The system yet further includes a multi-application instance deployment module 300.

The multi-application instance deployment module 300 includes computer program instructions that when executing in the memory of the host computing platform 210, are enabled to containerize an application manager into a selected one of the short lived containers 250, the application manager establishing an event bus and routing events placed onto the event bus to different event handlers 240 containerized into the selected one of the containers 250, along with performing authorization services and health status reporting services for the event handlers 240 containerized as part of one or more modules deployed into the selected one of the short-lived containers 250.

In this regard, the program instructions of the module 300 also containerize a kernel service into the selected one of the short-lived containers 250. The kernel service once executing in the selected one of the containers 250, consults a deployment manifest 260 and deploys from data storage 230 into the selected one of the short-lived containers 250, different collections of event handlers 240 each collection corresponding to a different application instance, such that the application manager already containerized within the selected one of the containers 250 manages communications between the event handlers 240 of the different application instances, by routing events on the event bus therebetween.

Figure 3:
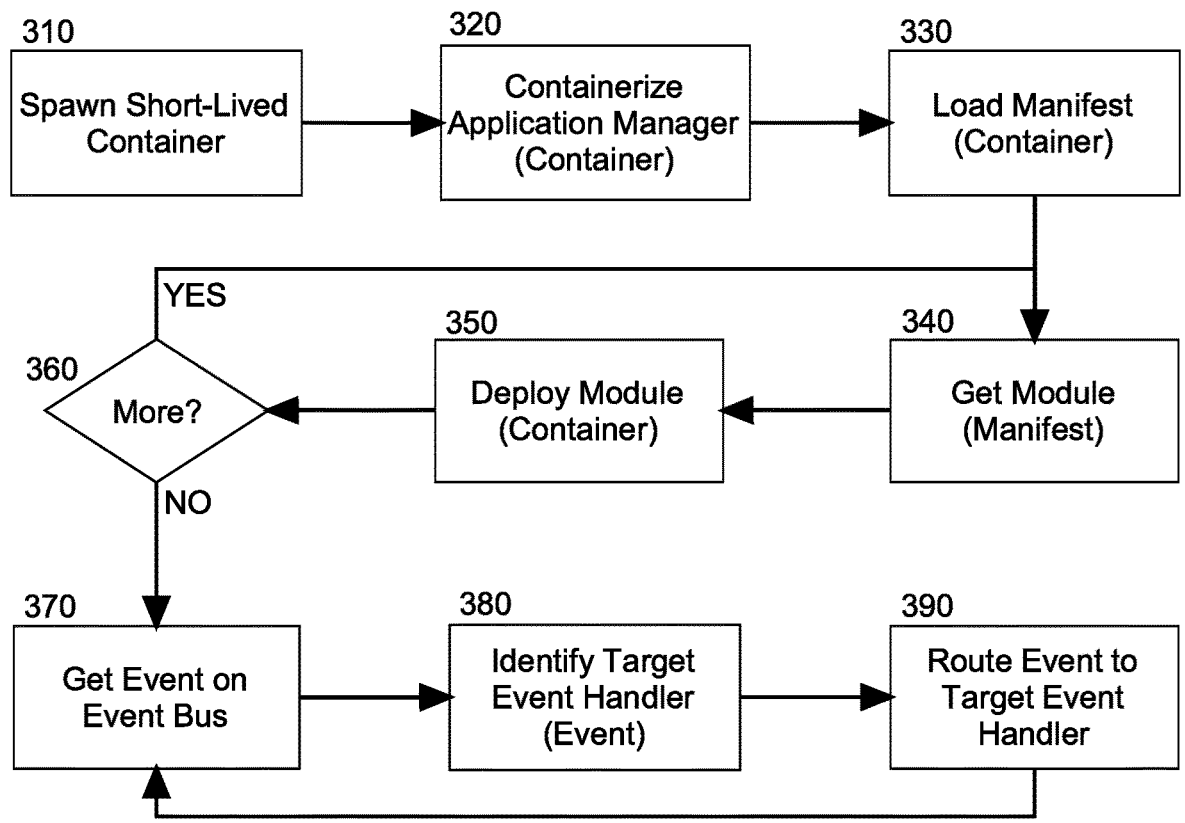

In even yet further illustration of the operation of the program instructions of the multi-application instance deployment module 300, FIG. 3 is a flow chart illustrating a process for multi-application instance deployment in a containerized environment. Beginning in block 310, a short-lived container is spawned within the container management environment and in block 320, an application manager is containerized within the spawned container along with a kernel service. Then, in block 330, the kernel service loads a manifest of modules, each module aggregating a different set of event handlers. In block 350, the kernel service then loads a first one of the modules of the manifest into the short-lived container.

In decision block 360, if additional modules of the manifest remain to be loaded into the short-lived container, the kernel service retrieves from fixed storage a next referenced one of the modules in block 340 and in block 350, the kernel service loads the next referenced one of the modules into the short-lived container. In decision block 360, when no further modules referenced in the manifest remain to be loaded into the short-lived container, in block 370 an event is retrieved from an event bus established in the short-lived container and, in block 380, the application selects a target one of the event handlers of a corresponding one of the modules loaded into the short-lived container to receive the event. Finally, in block 390, the application manager routes the event to the selected target one of the event handlers. The process then continues indefinitely during the life of the short-lived container.

In this way, the application manager functions as a virtualization layer within the short-lived container so as to accommodate multiple different applications instances within the short-lived container without requiring each application instances to supply logic for its own core operations including intra-module communications, authentication and health status monitoring and reporting.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for multi-application instance deployment in a containerized environment comprising:
   containerizing an instance of an application manager in a short-lived container, the application manager establishing an event bus including an event router adapted to route events on the event bus to corresponding ones of different event handlers designated to receive the events;
   deploying into the container, both a bundle of the different event handlers associated with one application instance of one application, each of the event handlers having programming to process a specific programmatic event received from the event bus on behalf of the one application instance of the one application, and also a bundle of additional event handlers associated with a different application instance of a different application each of the additional event handlers having programming to process a specific programmatic event also received on the event bus on behalf of the different application instance of the different application; and,
   managing inter-application communications between the one application instance and the different application instance in the application manager, and routing events on the event bus for both the one application instance and the different application instance in the event router included as part of the application manager,
   the application manager providing a virtualization layer on top of the short-lived container.

2. The method of claim 1, further comprising containerizing a kernel module within the short-lived container, the kernel module providing deployment and un-deployment services to each of the one application instance and the different application instance, in reference to a configuration map provided by the short-lived container.

3. The method of claim 2, the kernel module collecting health and status information from each of the one application instance and the different application instance.

4. The method of claim 1, wherein the application manager further provides authorization management with the short-lived container for each of the one application instance and the different application instance.

5. The method of claim 1, wherein the one application instance and the different application instance are instances of different versions of a same application.

6. A data processing system providing a multi-tenant environment and adapted for multi-application instance deployment, the system comprising:
   a host computing platform comprising one or more computers, each comprising memory and at least one processor; and,
   a multi-instance application deployment module comprising computer program instructions enabled while executing in the host computing platform to perform:
   containerizing an instance of an application manager in a short-lived container, the application manager establishing an event bus including an event router adapted to route events on the event bus to corresponding ones of different event handlers designated to receive the events;
   deploying into the container, both a bundle of the different event handlers associated with one application instance of one application, each of the event handlers having programming to process a specific programmatic event received from the event bus on behalf of the one application instance of the one application, and also a bundle of additional event handlers associated with a different application instance of a different application each of the additional event handlers having programming to process a specific programmatic event also received on the event bus on behalf of the different application instance of the different application; and,
   managing inter-application communications between the one application instance and the different application instance in the application manager, and routing events on the event bus for both the one application instance and the different application instance in the event router included as part of the application manager,
   the application manager providing a virtualization layer on top of the short-lived container.

7. The system of claim 6, wherein the program instructions further perform containerizing a kernel module within the short-lived container, the kernel module providing deployment and un-deployment services to each of the one application instance and the different application instance, in reference to a configuration map provided by the short-lived container.

8. The system of claim 7, the kernel module collecting health and status information from each of the one application instance and the different application instance.

9. The system of claim 6, wherein the application manager further provides authorization management with the short-lived container for each of the one application instance and the different application instance.

10. The system of claim 6, wherein the one application instance and the different application instance are instances of different versions of a same application.

11. A computer program product for multi-application instance deployment in a containerized environment, the computer program product including a non-transitory computer readable storage medium having program instructions embodied therewith, the program instructions executable by a device to cause the device to perform a method including:
   containerizing an instance of an application manager in a short-lived container, the application manager establishing an event bus including an event router adapted to route events on the event bus to corresponding ones of different event handlers designated to receive the events;
   deploying into the container, both a bundle of the different event handlers associated with one application instance of one application, each of the event handlers having programming to process a specific programmatic event received from the event bus on behalf of the one application instance of the one application, and also a bundle of additional event handlers associated with a different application instance of a different application each of the additional event handlers having programming to process a specific programmatic event also received on the event bus on behalf of the different application instance of the different application; and,
   managing inter-application communications between the one application instance and the different application instance in the application manager, and routing events on the event bus for both the one application instance and the different application instance in the event router included as part of the application manager,
   the application manager providing a virtualization layer on top of the short-lived container.

12. The computer program product of claim 11, wherein the method further comprises containerizing a kernel module within the short-lived container, the kernel module providing deployment and un-deployment services to each of the one application instance and the different application instance, in reference to a configuration map provided by the short-lived container.

13. The computer program product of claim 12, the kernel module collecting health and status information from each of the one application instance and the different application instance.

14. The computer program product of claim 11, wherein the application manager further provides authorization management with the short-lived container for each of the one application instance and the different application instance.

15. The computer program product of claim 11, wherein the one application instance and the different application instance are instances of different versions of a same application.

* * * * *